Patented Apr. 28, 1942

2,280,828

UNITED STATES PATENT OFFICE 2,280,828

PROCESS FOR THE MANUFACTURE OF COMPOUNDS OF THE CYCLOPENTANO-POLYHYDROPHENANTHRENE SERIES

Hans Herloff Inhoffen, Berlin-Wilmersdorf, Germany, assignor to Schering Corporation, Bloomfield, N. J., a corporation of New Jersey No Drawing. Application September 29, 1937, Serial No. 166,453. In Germany September 29, 1936

43 Claims. (Cl. 260—397.2)

This invention relates to a process for the manufacture of compounds of the cyclopentano-polyhydrophenanthrene series.

As is known, the members of the follicle hormone group such as oestrone, equilin, equilenin and the like, are distinguished from the other known sterol compounds from a constitutional point of view in particular in that they possess at least one aromatic ring, and indeed the ring A or the rings A and B of the four ring system are of aromatic nature. This is related to the fact that the members of the follicle hormone group possess in the ring system one C-atom less than all other known and well investigated derivatives of cyclopentano-polyhydrophenanthrene since ring A and/or ring B of this ring system cannot pass into the aromatic condition until the quaternary methyl group on the ring-linking C-atom 10 is split off or displaced to a C-atom which does not link the rings.

On account of this specific constitutional feature of the members of the follicle hormone group, their synthetic manufacture from easily available steroid compounds requires the solution of the new and very difficult problem, namely of the elimination from or displacement in the molecule of the steroid derivatives employed as starting material of a single C-atom, i. e. the quaternary 10-methyl group, that is very strongly attached to the sterol nucleus.

The fundamental idea of the present invention consists in that the steroid compounds employed as starting material are converted into derivatives which exhibit a quite particular unsaturated condition and that these latter compounds are rendered aromatic. This particular unsaturated condition has for its effect that the hitherto strongly attached 10-methyl group becomes so labile that it can now be removed, in general without destruction of other portions of the molecule, from its original position which prevents rendering aromatic the ring A or B.

According to the invention 3-ketones or corresponding enol derivatives of a sterol or steroid compound containing a 10-methyl group, which are singly or doubly unsaturated in ring A and if desired also in ring B or which contain a further 2- or 4-keto group and can then also be saturated, or the corresponding 3-hydroxy compounds, or starting materials easily convertible into such unsaturated compounds by dehydrogenation, splitting off of water, splitting off of hydrogen halide and so on, with or without isolation of the intermediate products, are treated with agents which effect a removal or displacement of the 10-methyl group and thereby render the starting materials aromatic or make possible a subsequent aromatization by simple splitting off of hydrogen.

The aromatization of the said starting materials is accomplished suitably by thermal treatment, for example by heating to elevated temperature such as 250–350° C. and above. The heating is advantageously carried out in the presence of high boiling solvents, if desired also under pressure and in an atmosphere of indifferent gases such as nitrogen and the like. In order to discover the best conditions for aromitization one suitably proceeds in such a manner that the reaction is carried out in a closed apparatus in the presence of carbon dioxide and, by slowly increasing the temperature, that temperature is ascertained at which in the attached glass burette, over 50% caustic potash lye, methane gas collects. It is suitable to maintain this ascertained temperature during the whole period of reaction in order to avoid unnecessary superheating with decomposition of the starting materials and reaction products. The end of the reaction can be immediately recognised by the cessation of the evolution of methane. According to the starting materials the degree of temperature and also the duration of heating may be very different. Thus the duration of reaction may range from a few minutes to several hours.

The splitting off of methane can also be accelerated by subjecting the reaction mixture during the thermal decomposition to the action of active rays, as for example ultra violet rays or ultra short rays and the like, or of supersonic waves.

As starting materials for the reaction of this invention there can primarily serve the following groups of compounds:

1. 3-ketones of steroids doubly unsaturated in ring A or their enol derivatives.

2. 3-ketones of steroids singly unsaturated in ring A or their enol derivatives, which in addition possess in ring A a group capable of being split off with formation of a further double bond.

3. 3-ketones of steroids singly unsaturated in ring A between the C-atoms 1 and 2 and their enol derivatives.

4. 3-hydroxy compounds of steroids doubly unsaturated in ring A and their derivatives.

5. 3-hydroxy compounds of steroids singly unsaturated in ring A, or their derivatives, which in addition possess in ring A a group capable of being spit off with formation of a further double bond.

6. 3-ketones singly unsaturated in ring A or their enol derivatives, which possess in ring B a further one or two double bonds or in ring B a group capable of being split off with formation of a double bond.

7. Saturated 2.3- or 3.4-diketones of steroids or their enol derivatives.

8. 2.3- or 3.4-diketones of steroids singly unsaturated in ring A or B or their enol derivatives.

9. Saturated 3-ketones of steroids which possess on the 2-carbon atom a group capable of being split off with formation of a double bond.

The reactions employed according to the invention are illustrated by way of example by the following formulae. In these Z indicates a group which is capable of being split off with the formation of a double bond in ring A, for example a hydroxy group or a group convertible thereinto, such as an ester or ether group, halogen or the like or a substituted or unsubstituted amino group, as for example the residue of pyridine, dimethylaniline or the like, Y a hydroxy group or a group which by hydrolysis or the like can be converted into the hydroxy group, for example an ether or ester group, halogen or an alcoholate or enolate group or the like, X either oxygen or the groupings $$\diagdown_{OH}^{H}, \diagdown_{OH}^{R}, \diagdown_{R}^{H} \diagup_{R'}, \text{ or } \diagdown_{H}^{R'}$$

in which R is a substituted or unsubstituted hydrocarbon residue and R' a group convertible into the hydroxy group. Instead of the free ketones it is also possible to subject their reaction products obtained by condensation with the customary ketone reagents such as semicarbazide, phenylhydrazine and the like to the reaction concerned.

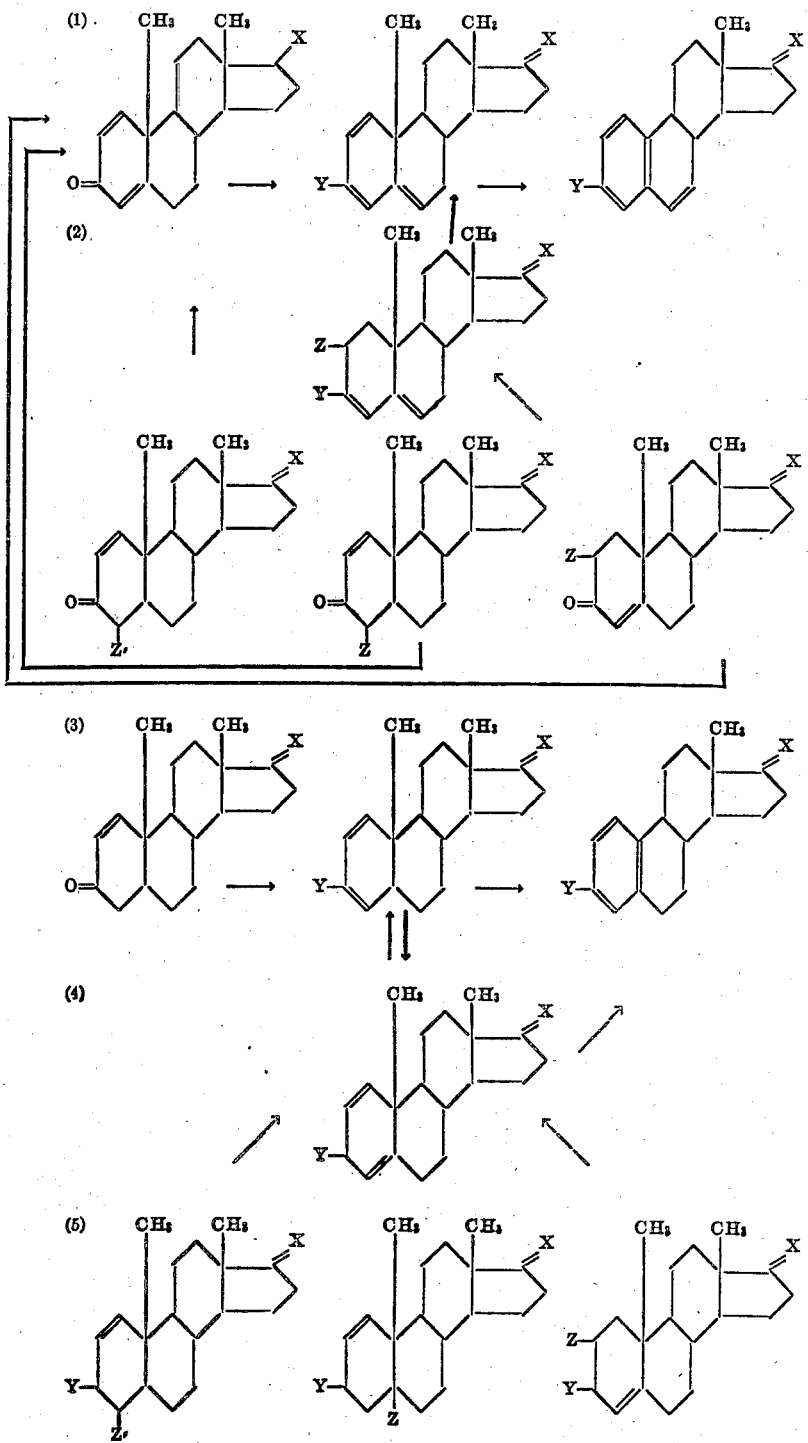

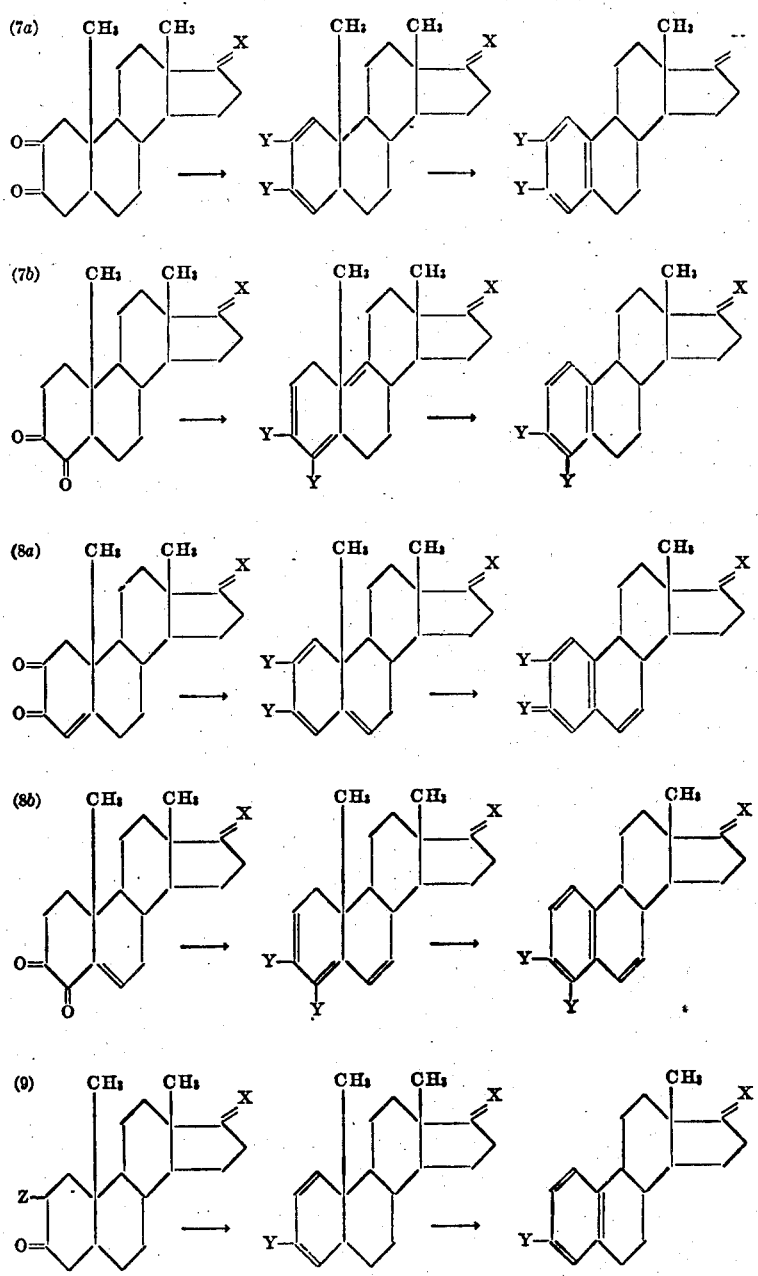

If aromatization takes place for example according to the Formulae 1, 6a, 8a, and 8b, the reaction products possess in addition to the aromatic ring A a further olefinic double bond in ring B which, if it is desired to produce compounds of the type of oestrone must be further saturated by the attachment of hydrogen.

From the above formulae it can be seen that the starting materials for the manufacture of partially aromatic steroids can be of great variety. It is essential for the present inventive idea that the specified starting materials, whether the reaction takes place by way of several well-defined intermediate stages, the products of which are to be separately isolated, or in a single reaction in which the same or similar intermediate stages are passed through, can be finally converted into such compounds as are termed "pre-aromatic stages," which exhibit in common the following constitutional features:

1. Two double bonds in ring A and
2. An alcoholic or enolic hydroxy group in ring A or a group convertible thereinto as is illustrated by the following formulae:

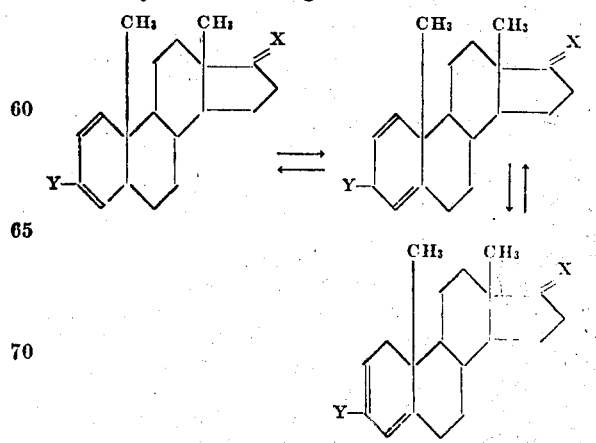

Variations of secondary importance may be as follows:

*a.* The "pre-aromatic stage" contains in addition one or more double bonds in ring B and

*b.* The two double bonds in ring A are produced by enolisation of two keto groups present in ring A as 's illustrated in the above Formulae 7a and *b*;

*c.* Unsaturated di-ketones find application of which the "pre-aromatic stages" are in addition unsaturated in ring B as is seen from Formulae 8*a* and *b*.

In addition to aromatization with splitting off of the 10-methyl group for example in the form of methane, in some circumstances aromatization can also take place in such a manner that the 10-methyl residue under suitable reaction conditions wanders or migrates to another carbon atom not connecting the rings, for example to the C-atom 1. This is possible for example when the starting materials are heated in the presence of mineral acid or when from compounds which contain a substituent on the carbon atom 1 this substituent is split off with formation of a double bond. Thus for example in the case of the starting materials of the above series 1, 8*a* and 8*b* by this means the aromatic condition is arrived at at the same time, whereas in the case of the starting materials of the series 3, 4, 7*a* and 7*b* in addition to the wandering of the methyl group also a splitting off of hydrogen must take place so that an aromatic ring is formed. This may be illustrated by way of example in the following formulae:

starting materials insofar as they contain in ring A on the carbon atom 3 a keto group and between the carbon atoms 1 and 2 and 4 and 5 in each case a double bond. Similarly suited are also the corresponding enol derivatives which instead of the keto group on the carbon atom 3 possess an enolic hydroxyl group; the double bond newly produced therein between the carbon atoms 3 and 4 naturally displaces the $\Delta^{4.5}$-double bond into the $\Delta^{5.6}$-position. Particularly suitable are the organic and inorganic esters of the enols, such as the acetate, benzoate or the halogen compounds; however one can also employ suitable ethers or the corresponding enolates for this purpose. Such starting materials can for example be obtained according to the process of specification Ser. No. 145,052.

As starting materials are also suitable the corresponding ketones of other sterols, of the pregnane and androstane compounds, further 3-oxocholanic acids and their lower homologues, bile acids and quite generally all compounds which exhibit a cyclopentano-polyhydrophenanthrene ring with a methyl group on the carbon atom 10 and in the ring A the structure of $\Delta^{1.2.4.5}$-cholestadienone-3.

As starting materials of group 2 can be employed intermediate products as are produced for example in the manufacture of the above specified doubly unsaturated ketones according to the process of specification Ser. No. 145,052. Such

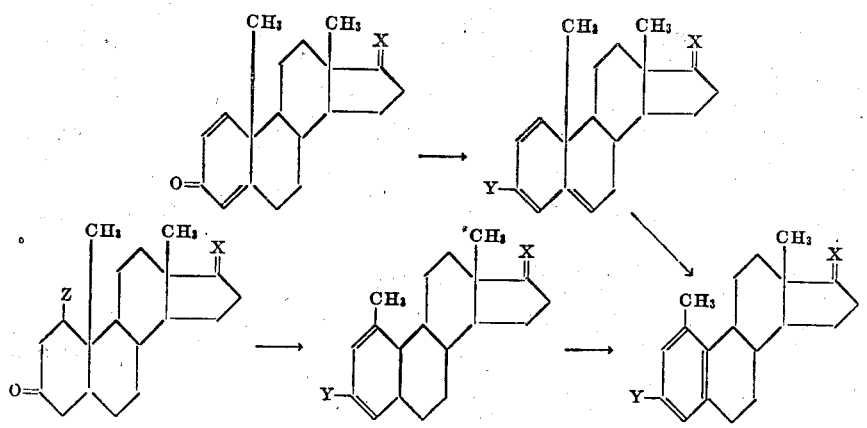

As starting materials of group 1 can be employed for example according to the invention the $\Delta^{1.2.4.5}$-cholestadienone-3. This ketone I can also react in enol form II:

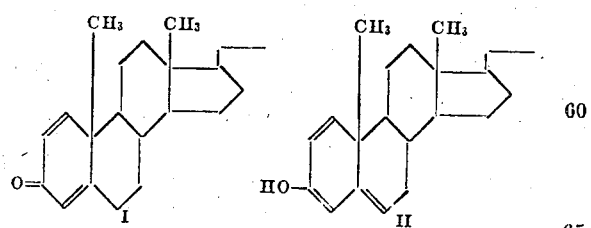

which can be ascertained for example by ester or ether formation or the like. The establishment of the enol group has the advantage that the oxygen atom on the carbon atom 3 is from the commencement located suitably for the future phenolic condition.

Instead of $\Delta^{1.2.4.5}$-cholestadienone-3 also other suitably constituted unsaturated ketones exhibiting the sterol nucleus can find application as compounds are illustrated for example by the following formulae:

$\Delta^{1.2}$-Cholestenone-3-yl-4-pyridinium-halogenide or hydroxide

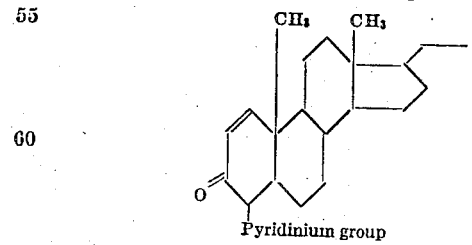

Pyridinium group $\Delta^{1.2}$-Androstendione-3.17-yl-4-pyridinium halogenide or hydroxide

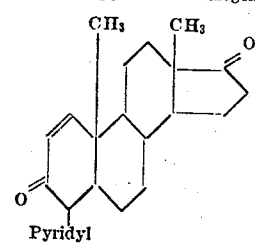

Pyridyl

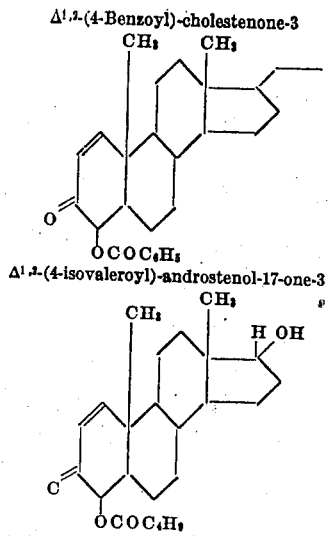

The pyridinium halogenide or hydroxide group can obviously be substituted and can contain for example halogen or one or more methyl groups.

It is not necessary to isolate these starting materials in substance on their manufacture and then further to render them aromatic. It is rather also possible to conduct the manufacturing conditions in such a manner that simultaneously without isolation of the intermediate products an aromatization takes place. A suitable after treatment is, however, to be recommended in such a case to complete the removal of the methyl group. Thus it is possible for example in the treatment of 3-ketones containing the sterol nucleus and polyhalogenated in ring A, which have at least one halogen atom on the carbon atom 2, for the purpose of introduction of double bonds in ring A, to effect aromatization, for example according to the process of specification Ser. No. 145,052 with high boiling organic bases, as for example with quinoline, diphenylamine and the like if the temperature of this treatment amounts to 220° C. or above. In this case it is to be recommended, for the removal of any hydrogen halide liberated by dissociation, to introduce into the reaction mixture agents binding halogen halide which do not enter into reaction with the steroid. As such agents are concerned primarily silver carbonate, silver oxide, calcium carbonate and the like.

Starting materials of the group 3 are constituted by compounds which may be designated for example by the following formulae:

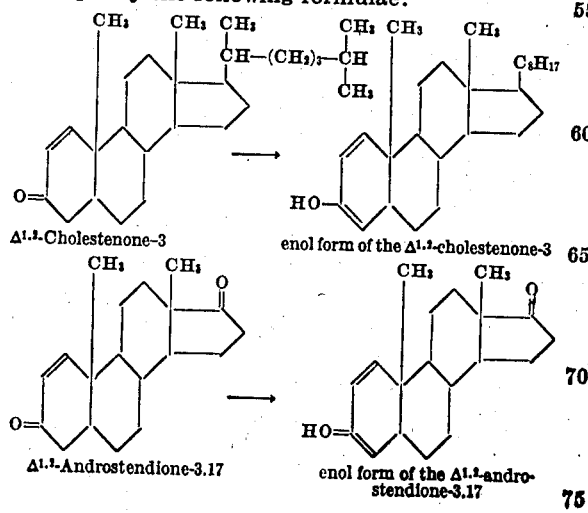

Instead of the above obviously also other compounds can be employed which have a sterol skeleton. It is likewise possible to employ starting materials of the groups 4 and 5 in which the keto group on the carbon atom 3 is converted into a secondary hydroxyl group. Such compounds can for example be obtained according to the process of specification Ser. No. 166,454 from 3-ketones doubly unsaturated in ring A or from 3-ketones singly unsaturated in ring A, containing a substituent which can be split off with the formation of a further double bond, by reduction of the keto group to the secondary alcohol group without saturation of the double bond.

As particularly suitable starting material serves in this case the $\Delta^{1,2,4,5}$-cholestadienol-3 or its esters or ethers; it is also possible however to employ the halogenates or alcoholates. It is also possible to start from the 4-pyridinium compounds of $\Delta^{1,2}$-cholestenol-3. The invention is obviously not limited to these substances. Rather have all similarly constituted compounds containing the sterol nucleus proved to be suitable in so far as they contain on the carbon atom 3 a secondary hydroxyl group or a group which by hydrolysis can be converted into the hydroxyl group and which possess in ring A either two double bonds or one double bond and a substituent which can be split off with the formation of a further double bond. Such compounds can, for example, be derived from the androstane and pregnane series, from the corresponding cholenic acids and their lower homologues, bile acids and other substances.

Starting materials of the groups 7 and 8 such as the 3.4-ketones of steroid compounds or their enol derivatives are obtainable for example according to the process described in specification No. 145,052 by means of which in addition also the corresponding 2.3-ketones or their enol compounds are obtainable by treatment of ketones polyhalogenated in ring A consecutively or simultaneously with agents splitting off halogen hydride and replacing halogen by an acyl residue such as alkali benzoate and saponification of the acyl compounds of the unsaturated hydroxy ketones obtained for example according to the following formulae:

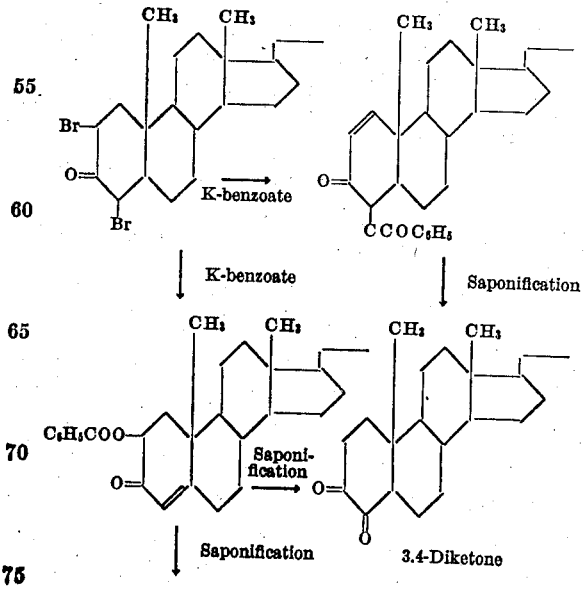

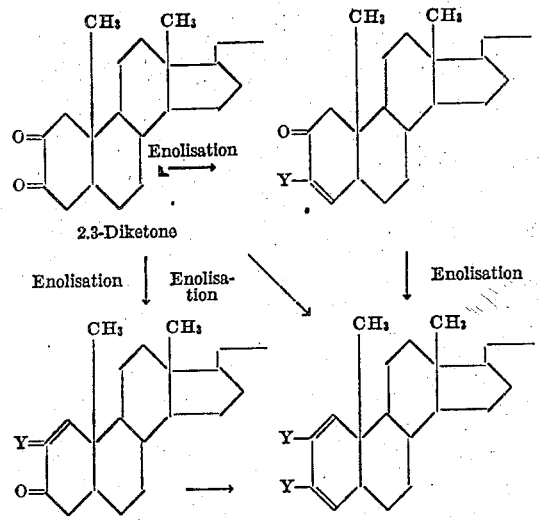

2,3-Diketone

Instead of the 3-ketones of steroids singly unsaturated in ring A there can also be employed as starting materials of group 9 such 3-ketones of steroids saturated in ring A as possess on the carbon atom 2 a group capable of being split off with formation of a double bond. The manufacture of these compounds can take place according to known processes for example by subjecting the 2-bromo-3-keto steroid to a treatment splitting off halogen hydride in which a double bond is produced between the C-atoms 1 and 2.

It is also possible however first to replace the halogen by an ester or ether residue or by a hydroxyl group and thereupon to split off this ester, ether or hydroxyl group with the formation of a double bond. The production of the 2-ester, 2-ether- or 2-hydroxy compounds takes place in the manner known per se, for example by treatment of the corresponding 2-halogen compounds with salts of organic acids such as potassium acetate, potassium benzoate, silver acetate and the like, suitably in the presence of organic solvents and at temperatures which do not lead to the production of the double bond in ring A. By saponification of these esters or ethers there are then obtained the corresponding 2-hydroxy compounds which by splitting off of water according to methods known per se can be converted into the $\Delta^{1.2}$-unsaturated steroid ketones.

For aromatization it is not necessary to isolate these saturated 3-steroid ketones containing in 2-position a substituent capable of being split off with formation of a double bond. It is also possible to combine the introduction of the double bond with the aromatization treatment, for example to heat the 2-esters of 3-steroid ketones to such temperatures at which simultaneously splitting off of the ester group and of the methyl group takes place.

In the case of starting materials possessing a side chain on the carbon atom 17, it is necessary for the conversion of the aromatic compounds obtained into substances of the nature of follicle hormone, after removal of the methyl group from the carbon atom 10, to split off this side chain, if desired after saturation of any olefinic double bond present in the ring system. This can take place in such a manner that the aromatic compounds obtained are subjected to oxidation, suitably with chromic acid. In this case, as set forth above, it is necessary to saturate any olefinic double bonds present by the addition of hydrogen or to protect them intermediately, for example by addition of halogen or halogen hydride, from the attack of the oxidising agent. The side chain in aromatic cholene carboxylic acids and similar acids can also be split off by degradation of their esters by way of the Grignard compounds according to Wieland or by way of the acid amides according to Curtius or Hofman or in other suitable manner. It is however also possible to split off the side chain as such with the formation of a double bond in the cyclopentane ring of the sterol ring system, for example by thermal treatment, if desired in the presence of suitable catalysts and to convert the unsaturated compound produced by methods known per se, for example by adding on water, oxygen or the like into a saturated ketone or a saturated alcohol.

The following examples illustrate the invention:

*Example 1*

3.5 grams of the isovalerate of hydroxy-cholestenone-3 obtained for example according to Example 2 of specification No. 145,052 are heated in a stream of carbon dioxide for one hour to 330–340° C. There are split off in addition to iso-valeric acid 35 ccs. of methane which are collected over 50% caustic potash lye. The reaction product is taken up in ether and the ether solution washed consecutively with dilute sodium carbonate solution and water. After evaporation of the ether the aromatic product thus obtained is distilled in high vacuum under 0.05 mm. pressure at 220° C. whereby it is obtained as a light oil which can be still further purified.

*Example 2*

5 grams of the 4-benzoate of $\Delta^{1.2}$-cholestenone-3-ol-4 of M. P. 177° C. obtained for example according to Example 3 of specification No. 145,052 are heated in a stream of carbon dioxide to 310–320° C. By this means benzoic acid, which sublimes in crystalline form in the cooler portion of the flask and 60 ccs. of methane are split off, which latter is collected over 50% caustic potash lye. After about two hours the evolution of methane ceases. The reaction product is taken up in ether and the ethereal solution for removal of the benzoic acid washed twice with sodium carbonate and twice with water.

For the purpose of further purification the aromatic product obtained is distilled in high vacuum under 0.0003 mm. pressure at 170–190° C. whereby it is obtained as a colourless oil which can be still further purified. This product is fully active in the Allen-Doisy test on rats in doses of 3 mg.

*Example 3*

1 gram of the crude $\Delta^{1.2.4.5}$-androstadiene-dione-3.17 obtained for example according to Example 6 of specification No. 145,052, is heated in a stream of carbon dioxide for five minutes to 300–310° C. whereby 10 cc. of methane are split off. The reaction product is taken up in ether. From the etheral solution the acid portions of the aromatic product are removed by extraction four times with 5% caustic potash lye. The phenolic portions isolated with ether after acidification with dilute hydrochloric acid are distilled in high vacuum under 0.0004 mm. pressure at 170–180° C. The distillate constitutes a partly crystalline light oil which in the Allen-Doisy test on rats is fully active in doses of 30γ, whereas the androstadiene-dione employed as starting material shows no oestrogenous effect with 150 times overdose, namely with 5 mg.

Example 4

5 grams of the crude $\Delta^{1.2.4.5}$-androstadiene-dione-3.17 obtainable for example according to Example 6 of specification No. 145,052 are heated in a flask under carbon dioxide to 300–310° C. The aromatization is complete in about five minutes during which in an attached gas burette 70 cc. of methane are collected.

The reaction product is treated with ether whereby a portion remains as insoluble from which the solution is filtered. The ether soluble portion is washed four times with 5% caustic potash lye and twice with water whereby the phenolic portions are removed. The alkaline-aqueous extracts are now acidified with hydrochloric acid and the acid portion taken up in ether.

The oil, 250 mg. obtained after the evaporation of the ether, is for further purification distilled in high vacuum at 170–180° C. under 0.0004 mm. pressure. By this means a light distillate is obtained which is dissolved with ether. Therefrom are obtained after evaporation of the ether 100 mg. of an oil which for further purification is treated with a little ether whereby crystals are obtained which can be filtered with suction and washed with ether. The crude product thus obtained exhibits a melting point of 245–250° C. By once recrystallising from dilute alcohol 11 mg. of crystals are obtained.

In a further experiment 5 grams of the still crude halogen containing $\Delta^{1.2.4.5}$-androstadiene-dione-3.17, the ether solution of which has previously been washed with dilute caustic potash lye for the purpose of removal of acid products, are heated with the addition of 1 gram of sodium acetate in the manner set forth above whereby 80 cc. of methane are split off and the product likewise worked up whereby 38 mg. are obtained of a weak yellow crystal powder which decomposes between 235–245° C.

The iso-equilin obtained according to both of the above methods crystallises from dilute alcohol in fine needles of melting point 250–252° C. A reddish colouration and slight sintering sets in about 10° below the melting point. This preparation gave in dioxane solution an optical rotation of $[\alpha]^{12}_D = +170°$. After a further recrystallisation the melting point was unchanged. The absorption spectrum of the doubly recrystallised product exhibits maxima at 265, 275 and 334 M$\mu$. Physiological testing gave the following result:

In the Allen-Doisy test on rats, 60 γ were fully active divided among six administrations in aqueous solution within two days, whereas 30 γ gave no action.

Analysis gives an empirical formula of $C_{18}H_{20}O_2$ according to which a compound is concerned of the same formula as equilin. Identity with equilin (M. P. 238–240° C. $[\alpha]_D + 308°$) is however excluded on account of the melting point and rotation. Further the spectrum, in contradistinction to that of equilin and also of oestrone exhibits a maximum at 334 m$\mu$. On the whole the spectrum is more similar to that of equilenin. Identity with equilenin, apart from the analysis, cannot be considered on account of the rotation. The mixed melting point with an equilenin preparation of M. P. 245–247° C. was 243–244° C. showing therefore a slight depression.

There is involved therefore a new member of the follicle hormone group, to which can probably be ascribed the constitution of an iso-equilin,

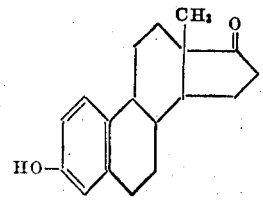

The fourth double bond on account of the absorption maximum at 334 m$\mu$ is assumed to be in conjugation with the benzene nucleus; it could also obviously lie between $C_8$ and $C_9$ or $C_9$ and $C_{11}$.

The mother liquor product remaining after separation of the iso-equilin still shows in doses of 30 γ in the Allen-Doisy test the full physiological effect.

Example 5

In the manufacture of $\Delta^{1.2.4.5}$-androstadiene-dione-3.17 by treatment of dibromandrostandione with pyridine there is obtained, as for example is seen from Example 6 specification No. 145,052, together with the said doubly unsaturated diketone a water-soluble ketone containing pyridine and halogen. This product can be directly rendered aromatic whereby both the pyridine-halogen component and also methane are split off. For this purpose 6 grams of the pyridine body are heated in a flask under carbon dioxide to 300° C. By this means within a few minutes an easily mobile liquid is split off which distils into the upper part of the flask and further 65 cc. of methane. The heating product which has now become quite insoluble in water, is taken up in ether and filtered off from ether insoluble products produced. From the ether solution, as described in Example 4, by means of 5% caustic potash lye the acid portions are separated and are purified by distillation in high vacuum. Yield 0.3 gram. The aromatic product obtained is active with 5 γ in the Allen-Doisy test.

20.2 grams of the pyridine compound obtained in the pyridine treatment of the dibromoandrostandione are heated with the addition of 5 grams of sodium acetate in a carbon dioxide stream to 300°–320° C., whereby within ten minutes 200 cc. of methane are split off. The product is taken up in chloroform, since the ether insoluble portions disturb the extraction. The acid portion isolated as set forth above, 1.7 grams, is distilled in high vacuum at 170°–180° C. and the distillate obtained again distilled at 160° C.; yield 0.8 gram. The aromatic product on ether treatment does not separate any iso-equilin crystals. It is likewise active with 5 γ in the Allen-Doisy test. After some standing with a little ether crystals are finally obtained which melt at 219–232° and exhibit an oestrogenic activity with 2 γ.

Example 6

3 grams of the cholestadienone of M. P. 109–110° C. obtained for example according to Example 5 of specification No. 145,052 are heated in a stream of carbon dioxide to 300–320° C., whereby within fifteen minutes 26 cc. of methane are split off. The product rendered aromatic is purified by high vacuum distillation under 0.0003 mm. pressure at 190–200° C., whereby it is obtained as a light oil.

16 grams of the cholestadienone mother liquors, which liquors have been purified by high vacuum distillation are heated in a stream of carbon dioxide to 310–320° C., whereby within 25 minutes 160 cc. of methane are split off. The product rendered aromatic is purified by high vacuum distillation under 0.0003 mm. pressure at 180–190° C.; yield 4 g. of a light oil.

Example 7

On 1 hour's heating of 1.2 gm. of cholestandione-2,3 in a stream of carbon dioxide to 340° C., 10 cc. of methane would split off. The aromatic product is purified by high vacuum distillation. Yield: 240 mg. of a light oil.

Example 8

38.4 grams of the crude $\Delta^{1,2,4,5}$-cholestadienol-3 obtainable for example according to Example 1 of specification No. 166,454 are heated in a carbon dioxide stream to about 220–240° C., whereby within ten minutes 125 cc. of methane split off. The heating is interrupted, the product taken up in ether and the acid portion separated by extracting three times with 5% caustic potash lye and washing twice with water. After the acidification of the alkaline-aqueous solutions the phenolic portions are taken up again in ether and thereupon after the evaporation of the ether distilled in high vacuum at 190–210° C. under 0.0003 mm. pressure; by this means 0.8 gram of a light oil is obtained.

The neutral main product is again heated in a carbon dioxide stream, this time to 300° C., whereby within 10 minutes a further 265 cc. of methane are split off. The acid portions isolated in the same manner as above are likewise distilled in high vacuum at 200–210° C. and the distillate is again distilled at the same temperature; yield 0.7 gram of a partly crystalline product, so that altogether 1.5 grams of the aromatic phenol are obtained.

Example 9

2 grams of the crude $\Delta^{1,2,4,5}$-androstadienediol-3,17 obtainable according to Example 2 of specification Nos. 166,454 and 145,052 are first acetylated by one hour's heating on the water bath with a mixture of 5 cc. of pyridine and 5 cc. of acetic anhydride and the product, after driving off the solvent in vacuum, heated in a carbon dioxide stream to 300° C. whereby within 5 minutes 15 cc. of methane are split off.

The heating product is treated with ether, filtered from insoluble portions and the ether-soluble portion purified by high vacuum distillation. The distillate is boiled with an excess of 6% alcoholic caustic potash lye for the purpose of saponification of the acetyl group for 2 hours on the water bath. After dilution and acidification of the alcoholic-alkaline solution the total material is taken up in ether and now the phenolic portions isolated as described in the previous examples and purified by high vacuum distillation.

The aromatic product thus obtained, 60 mg. produces the full oestrus reaction in the case of castrated rats with a dose of only 2 γ.

The further increase of the power of the oestrogenous active material takes place in the following manner: The product is dissolved in a little hot alcohol and treated with a solution 50 mg. of digitonin also in a little hot alcohol. The mixture of digitonide and digitonine crystallising out on cooling after short standing, is filtered with suction, washed with alcohol and dried. Now the digitonide-digitonine mixture is heated in a retort in high vacuum for 2 hours to 200–220° C., whereby the steroid portion liberated on account of thermal decomposition distils off. The practically white remaining digitonine in this treatment only decomposes to a slight extent, giving rise to a small sublimate of ether insoluble crystals. The distillate is treated with ether, whereby only the steroid portion passes into solution. In this manner 8 mg. are obtained of a substance which is fully active in the Allen-Doisy test on rats in an amount of only 0.4 γ.

Example 10

50 grams of 2-bromo-cholestanone-3 are treated with 25 grams of potassium benzoate and a mixture of 500 cc. of butanol and 200 cc. of toluene and the mixture boiled for 2 hours under reflux. Then the solution from which potassium bromide has separated, is concentrated in vacuum and the residue taken up in ether and treated with water. The washed ether solution is evaporated to dryness and the remaining oily reaction product dissolved in alcohol with the addition of ether. After several days standing a product for the most part crystalline has separated out which is filtered with suction and washed with alcohol.

For purification the benzoate of the 2-hydroxycholestanone-3 thus obtained is recrystallised from acetone-alcohol whereby the benzoate is obtained in beautiful crystals of melting point 198° C.; yield 3.6 grams.

From the mother liquor there can be recovered from ether-alcohol a further 11.6 grams of crystals of M. P. 126° C. which after recrystallisation from petrol ether-alcohol give 5.9 grams of a crystallisate of melting point 136° C.

10 grams of the 2-benzoate of cholestanone-3-ol-2 are treated with a solution of 10 grams of caustic potash in 100 cc. of methanol and the mixture boiled under reflux for 2 hours. After cooling the solution is diluted with water, extracted with ether and the washed ether solution evaporated to dryness. The remaining oil is taken up in alcohol with the addition of some acetone. The crystals separated after long standing of 2-hydroxy-cholestanone-3 are filtered with suction and washed with methanol. The crude product melts at 115–117° C. and can be still further purified by recrystallisation from acetone alcohol, melting point 120–127° C.

From the 2-hydroxy-cholestanone-3 thus obtained, by methods known per se, for example by heating with agents splitting off water such as phosphoric acid, phosphorus pentoxide, potassium bisulphate, zinc chloride and the like, the secondary hydroxyl group can be split off from the carbon atom with the formation of a double bond whereby $\Delta^{1,2}$-cholestenone-3 is obtained. The aromatization of this ketone takes place according to the methods described in the previous examples.

The same reactions can also be carried out in the same way with the 2-halogen-3-keto-androstane and pregnane compounds.

*Example 11*

100 mg. of $\Delta^{1,2}$-androstendione-3,17 are heated in a carbon dioxide stream for 15 minutes to 310° C. From the product rendered aromatic which is taken up in ether the phenolic portions are separated in the customary manner and distilled in high vacuum at 180° C.; the distillate, 5 mg. is active in the Allen-Doisy test.

*Example 12*

9 grams of 2-bromo-cholestanone-3 are treated according to the method of Butenandt and Wolff, Berichte der Deutschen Chemischen Gesellschaft, vol. 68 (1935), page 2091, for splitting off of hydrobromic acid, with potassium acetate-acetic acid solution at 200° C.

The product thus produced is distilled in high vacuum at 200° C. whereby 6.5 grams of a distillate are obtained which contains the $\Delta^{1,2}$-cholestenone-3 and the 2-acetoxy-cholestanone-3.

The above 6.5 grams of the distillate containing $\Delta^{1,2}$-cholestenone-3 and 2-acetoxy-cholestanone-3 are heated in a stream of carbon dioxide for one hour to 320–330° C. whereby 35 cc. of methane are split off, and finally distilled in high vacuum at 190° C., whereby the aromatic product distils over as a light oil, yield 0.4 gram.

*Example 13*

1 gram of the phenolic compound obtained according to Example 10 is acetylated in a well-known manner with acetic anhydride in pyridine, whereupon the solvents are removed by evaporation in vacuum. The acetylated compound is then dissolved in 30 cc. of glacial acetic acid and, to the solution in order to split off the side chain by oxidation added a solution of chromium trioxide in acetic acid containing small amounts of water. After warming the oxidation mixture for two hours on the water bath and diluting with water the oxidation product is extracted with ether. The acids formed on oxidation are removed from the ethereal solution by shaking with sodium bicarbonate solution. Thereafter the oxidation product obtained after evaporation of the ether is further purified by distillation in a high vacuum whereby a distillate is obtained that exhibits considerable activity in the Allen-Doisy test.

*Example 14*

0.5 gram of 2-bromo-androstandione-3.17 are mixed with 0.5 gram of sodium benzoate and a mixture of 5 cc. of butanol and 2 cc. of toluene. The mixture is boiled for one hour under reflux. The solution from which the precipitated potassium bromide has been separated is evaporated to dryness in a vacuum and the residue is treated with water and ether. After washing and drying the ethereal solution is evaporated whereby a reaction product crystallizes that is comparatively difficultly soluble in ether. After filtering off by suction and washing with ether the 2-benzoate of 2-hydroxy-androstandione-3.17 obtained thereby in an amount of 0.2 gram is recrystallized from ether whereby fine needles are obtained that start to melt at 188–189° C. (after preceding sintering) and that are completely melted and form a clear melt at 220° C.

The transformation of this compound into the corresponding 2-hydroxy-androstandione-3.17, the introduction of the $\Delta^{1,2}$-double bond into said compound and the aromatisation of the $\Delta^{1,2}$-androstendione-3.17 is carried out in an analogous manner as described for instance in Example 10 for the 2-benzoate of cholestanone-3-ol-2 whereby a phenolic compound is obtained that is highly active in the Allen-Doisy test.

The reaction conditions in the process of rendering aromatic can obviously be varied in various ways. Thus for example the reaction for rendering aromatic, particularly with the application of ketones doubly unsaturated in ring A, can be carried out quite generally with the aid of such agents as are capable of serving as so-called "methyl-acceptors." In this case the reaction takes place in such a manner that from the steroids containing a 10-methyl group the 10-methyl group is liberated in the course of the thermal treatment and taken up by the substance acting as "methyl acceptor" and naturally present in excess, while the valency rendered free on the carbon atom 10 of the steroid ring system is occupied by hydrogen.

With the application of such starting materials as for example contain residual difficultly removable halogen, or in which the 3-keto group is replaced by a 3-enol-halogenide group the reaction for rendering aromatic is if desired carried out in the presence of salts of organic acids reacting with halogen hydride, as for example sodium acetate, potassium benzoate and the like.

The desired aromatization can also be effected for example by the action of super-heated steam or mercury vapor at about 300° C.

In many cases it is to be recommended to stir or drop the substance, finely powdered or dissolved in a suitable high boiling medium into liquids or melts of organic or inorganic substances heated to about 300° C. By this means among other things the effect is intended to be obtained that the substance to be rendered aromatic is suddenly heated to the temperature necessary for the splitting off of methyl, so that the reaction for rendering aromatic preponderates over other reactions, as for example shifts of the double bonds that already take place at lower temperature.

Finally the reaction for rendering aromatic can also take place in the presence of catalysts which facilitate splitting off of methane, for example metals such as palladium, platinum, nickel, copper and the like, metalloids as for example selenium or sulphur, oxides, for example silicon oxide, aluminium oxide and the like, boric anhydrides or other compounds containing boron. Also heating of the starting materials in the presence of heavy metal salts leads to the required result.

The isolation and separation of the various reaction intermediate and end products from the reaction mixture can take place not only by extraction with suitable solvents and evaporation thereof or by precipitation of the compounds from their solutions with water or other organic solvents in which they are insoluble, while by-products and impurities remain dissolved therein; it is rather possible also to employ other processes for example those in which ketones form insoluble or difficultly soluble condensation products for example with typical ketone reagents, semicarbazides and the like.

The purification of the intermediate and end products can be carried out by fractional and/or repeated recrystallization, distillation or sublimation or by other methods.

Also can be used as starting materials such 3-ketones of steroids, which possess 2 double bonds in ring A and one double bond in ring B or in ring B a group capable of being split off with the formation of a further double bond, or their enol derivatives. This group of compounds may be illustrated by the following structural formulae:

saturated in ring A, and their derivatives, which in addition possess in ring A a group capable of being split off with formation of a further double bond, said derivatives having a group convertible with the aid of hydrolysis into hydroxyl attached

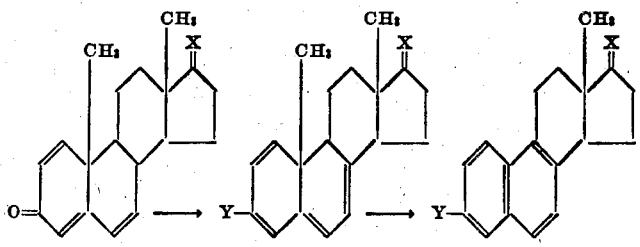

*Example 15*

0.2 gram of $\Delta^{4.5}$-bromo-6-androstendione-3,17 are dissolved in 10 cc. of an 8% solution of silver nitrate in anhydrous pyridine and the reaction mixture allowed to stand for 40 hours at room temperature. Thereupon the solution is treated with ether and acidified. The ether layer is washed with water and the ether evaporated. From the residue there can be isolated the $\Delta^{4.5\,;\,6.7}$-androstadiene-dione-3,17, suitably by fractional adsorption an aluminium oxide with subsequent elutriation. The compound after recrystallization from a mixture of benzine-ethyl acetate exhibits a melting point of 172° C.

Instead of pyridine it is also possible to employ other bases which can be used for the splitting off of halogen hydride, likewise the silver nitrate can be replaced by other soluble silver salts. Also by treatment with the base alone the doubly unsaturated compound can be produced.

As starting materials come into question, apart from the compound employed in the example, also other compounds of the androstane and pregnane series, as for example the corresponding halogenated testosterones, progesterones, pregnanolones and their derivatives, as for example the hydroxy derivatives of the corresponding 17- and 20-alcohols or the androstane compounds containing in the 17-position a hydrocarbon residue and a hydroxy group and the like as are obtained for example by a process analogous to that described by Ruzicka for the $\Delta^{4.5}$-bromo-6-androstendione-3,17.

The above enol compounds are subjected in the same manner to the heating reaction as set forth hereinabove.

Of course, many other changes and variations may be made by those skilled in the art in accordance with the principles set forth herein and in the claims annexed hereto.

What I claim is:

1. A process for the manufacture of unsaturated compounds of the cyclopentanopolyhydrophenanthrene series, comprising subjecting a 10-methyl cyclopentanopolyhydrophenanthrene compound selected from the group consisting of (1) 3-ketones of steroids doubly unsaturated in ring A and their enol derivatives; (2) 3-ketones of steroids singly unsaturated in ring A and their enol derivatives, which in addition possess in ring A a group capable of being split off with formation of a further double bond; (3) 3-ketones of steroids singly unsaturated in ring A between the C-atoms 1 and 2 and their enol derivatives; (4) 3-hydroxy compounds of steroids doubly unsaturated in ring A and their derivatives in which a group convertible with the aid of hydrolysis into hydroxyl is attached to the 3-carbon atom; (5) 3-hydroxy compounds of steroids singly unsaturated in ring A, and their derivatives, which in addition possess in ring A a group capable of being split off with formation of a further double bond, said derivatives having a group convertible with the aid of hydrolysis into hydroxyl attached to the 3-position; (6) 3-ketones singly unsaturated in ring A and their enol derivatives, which possess in ring B at least one double bond, and 3-ketones singly unsaturated in ring A and their enol derivatives, which possess in ring B a group capable of being split off with formation of a double bond; (7) saturated 2,3- and 3,4-diketones of steroids and their enol derivatives; (8) 2,3- and 3,4-diketones of steroids singly unsaturated in one of the rings A and B and their enol derivatives; (9) saturated 3-ketones of steroids which possess, on the 2-carbon atom a group capable of being split off with formation of a double bond; to a thermal treatment, whereby the methyl group is removed from the 10-position and a double bond is introduced into ring A.

2. Process as claimed in claim 1 in which the methyl group is split off from the compound.

3. Process as claimed in claim 1 in which the methyl group is displaced to a carbon atom other than at a point of junction of the rings of the phenanthrene ring system.

4. A process for the manufacture of unsaturated compounds of the cyclopentano polyhydro phenanthrene series, comprising subjecting a 3-keto-10-methyl steroid compound doubly unsaturated in ring A to a thermal treatment whereby the methyl group is removed from the 10-position and a double bond is introduced into ring A.

5. A process for the manufacture of unsaturated compounds of the cyclopentano polyhydro phenanthrene series comprising subjecting a 3-keto-10-methyl steroid compound singly unsaturated between C-atoms 1 and 2 in ring A to a thermal treatment whereby the methyl group is removed from the 10-position and a double bond is introduced into ring A.

6. A process for the manufacture of unsaturated compounds of the cyclopentano polyhydro phenanthrene series, comprising subjecting a 3-keto-10-methyl steroid compound which is singly unsaturated in ring A and contains a group capable of splitting off with the formation of a further double bond, to a thermal treatment whereby the methyl group is removed from the 10-position and a double bond is introduced into ring A.

7. A process for the manufacture of unsaturated compounds of the cyclopentano polyhydro phenanthrene series, comprising subjecting a 3-keto-10-methyl steroid compound singly unsaturated in ring A and having at least one, but at most two, double bonds, in ring B, to a thermal treatment whereby the methyl group is removed from the 10-position and a double bond is introduced into ring A.

8. A process for the manufacture of unsaturated compounds of the cyclopentano polyhydro phenanthrene series, comprising subjecting a hydroxy-10-methyl steroid compound doubly unsaturated in ring A to a thermal treatment whereby the methyl group is removed from the 10-position and a double bond is introduced into ring A.

9. A process for the manufacture of unsaturated compounds of the cyclopentano polyhydro phenanthrene series comprising subjecting a 10-methyl steroid diketone whose keto groups are located at adjacent carbons between the 2 and 4 carbon atoms inclusive, to a thermal treatment whereby the methyl group is removed from the 10-position and a double bond is introduced into ring A.

10. A process for the manufacture of unsaturated compounds of the cyclopentano polyhydro phenanthrene series, comprising subjecting a 10-methyl steroid diketone whose keto groups are located at adjacent carbons between the 2 and 4 carbon atoms inclusive and which is singly unsaturated in at least one of the rings A and B, to a thermal treatment whereby the methyl group is removed from the 10-position and a double bond is introduced into ring A.

11. A process for the manufacture of unsaturated compounds of the cyclopentano polyhydro phenanthrene series, comprising subjecting a 10-methyl steroid compound obtained as intermediate product in the manufacture of 3-keto steroids doubly unsaturated in ring A, to a thermal treatment whereby the methyl group is removed from the 10-position and a double bond is introduced into ring A.

12. A process for the manufacture of unsaturated compounds of the cyclopentano polyhydro phenanthrene series, comprising subjecting an enol compound, obtainable by reacting a plurally unsaturated 10-methyl steroid ketone containing in ring A a double bond and in ring B at least one double bond, with an enolizing agent capable of forming a stable enol derivative, to a thermal treatment whereby the methyl group is removed from the 10-position and a double bond is introduced into ring A.

13. A process for the manufacture of unsaturated compounds of the cyclopentano polyhydro phenanthrene series, comprising subjecting a ketone of the androstane series plurally unsaturated in the ring system, obtained by treatment of $\Delta^{4,5}$-6-halogeno-androstenone-3 compounds with an agent capable of splitting off halogen hydride, to a thermal treatment whereby the methyl group is removed from the 10-position and a double bond is introduced into ring A.

14. A process for the manufacture of unsaturated compounds of the cyclopentano polyhydro phenanthrene series, comprising subjecting a 3-keto-10-methyl steroid compound saturated in ring A and possessing on the 2-carbon atom a group capable of being split off with the formation of a double bond, to a thermal treatment whereby the methyl group is removed from the 10-position and a double bond is introduced into ring A.

15. A process for the manufacture of unsaturated compounds of the cyclopentano polyhydro phenanthrene series, comprising subjecting a 2-halogen-3-keto-10-methyl steroid compound to a thermal treatment whereby the methyl group is removed from the 10-position and a double bond is introduced into ring A.

16. A process for the manufacture of unsaturated compounds of the cyclopentano polyhydro phenanthrene series, comprising subjecting a 2-bromo-cholestanone-3 to a thermal treatment whereby the methyl group is removed from the 10-position and a double bond is introduced into ring A.

17. Process as claimed in claim 1 in which the aromatization is effected simultaneously with the manufacture of the starting material from other cyclopentano polyhydro phenanthrene compounds.

18. A process for the manufacture of unsaturated compounds of the cyclopentano polyhydro phenanthrene series, comprising treating 10-methyl steroid alcohols singly unsaturated in ring A and containing a substituent which can be split off with formation of a second double bond in ring A with an agent capable of introducing a second double bond into ring A, and thereafter treating the resulting compound with an agent capable of rendering the first ring aromatic.

19. A process for the manufacture of unsaturated compounds of the cyclopentano polyhydro phenanthrene series, comprising subjecting 3-keto-10-methyl steroid compounds polyhalogenated in ring A and containing at least one 2-halogen atom, in the presence of bases to such an elevated temperature that an aromatization of ring A takes place.

20. A process as claimed in claim 19, wherein the treatment is performed in the presence of an agent binding halogen hydride but not entering into reaction with the steroid.

21. Process as claimed in claim 1 in which the starting materials are heated to a temperature of 250–350° C.

22. Process as claimed in claim 1 in which the starting materials are heated in the presence of solvents.

23. Process as claimed in claim 1 in which the starting materials are heated in the presence of an inert gas.

24. Process as claimed in claim 1 in which the starting materials are heated under pressure.

25. Process as claimed in claim 1 in which migration of the 10-methyl group to another carbon atom is effected by treatment with mineral acid.

26. Process as claimed in claim 1 in which in the aromatic sterol compounds produced in so far as they contain on the carbon atom 17 an aliphatic hydrocarbon residue, this hydrocarbon residue is split off by the action of oxidising agents.

27. Process as claimed in claim 1 in which in the aromatic sterol compounds produced in so far as they contain on the carbon atom 17 an aliphatic hydrocarbon residue, this hydrocarbon residue is split off by oxidation with chromic acid.

28. Process as claimed in claim 1 in which in the aromatic sterol compounds produced in so far as they contain on the carbon atom 17 an aliphatic hydrocarbon residue, this hydrocarbon residue is split off by subjecting the product to a thermal treatment, and thereupon the compounds unsaturated in the cyclopentane ring obtained treated with agents which are capable of adding on a member of the group consisting of oxygen as such and OH groups.

29. A process for the manufacture of enol compounds of steroid ketones plurally unsaturated in the ring system but containing no double bond in any side chain present, comprising treating such steroid ketones with an enolizing agent capable of forming a stable enol ether.

30. As a new composition of matter the substance of the probable formula

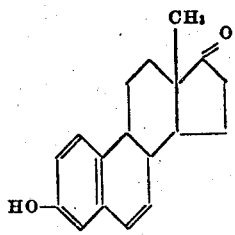

of melting point 250–252° C., having in dioxane solution an optical rotation of $[\alpha]^{19}_D = +170°$ having an absorption spectrum exhibiting maxima at 265, 275 and 334 mμ and being fully active in the Allen-Doisy test on rats in an amount of 60 γ divided into six administrations in two days.

31. The method of producing cyclopentano polyhydrophenanthrene compounds comprising subjecting a 10-methyl compound of the cyclopentano polyhydrophenanthrene series containing in ring A a double bond and a substituent capable of yielding a second double bond in such ring, to a thermal treatment whereby the methyl group is removed from the 10-position and ring A is rendered more highly unsaturated.

32. The method of producing cyclopentano polyhydrophenanthrene compounds comprising subjecting a 10-methyl compound of the cyclopentano polyhydrophenanthrene series containing in ring A at least one substituent capable of yielding a double bond in such ring, to a thermal treatment whereby the methyl group is removed from the 10-position and a double bond is simultaneously introduced into ring A.

33. A process for the manufacture of unsaturated compounds of the cyclopentano polyhydro phenanthrene series, comprising subjecting an isomer of a 3-substituted 10-methyl steroid unsaturated in ring A in the $\Delta^{1,2}$-position, whose ketonic form is represented by the structural formula

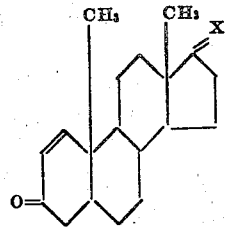

in which X indicates a member of the group consisting of oxygen and saturated and unsaturated hydrocarbon residues, to a thermal treatment whereby the methyl group is removed from the 10-position and a double bond is introduced into ring A.

34. A process for the manufacture of unsaturated compounds of the cyclopentano polyhydro phenanthrene series, comprising subjecting a 3-oxo-10-methyl steroid compound unsaturated in ring A in the 1,2-position to a thermal treatment whereby the methyl group is removed from the 10-position and a double bond is introduced into ring A.

35. A process for the manufacture of unsaturated compounds of the cyclopentano polyhydro phenanthrene series, comprising subjecting a 10,13-dimethyl cyclopentano polyhydro phenanthrene compound doubly unsaturated in ring A and singly unsaturated in ring B and having a substituent taken from the class consisting of hydroxy, ester, and ether groups attached to the 3 carbon atom, to a thermal treatment whereby the methyl group is removed from the 10-position and a double bond is introduced into ring A.

36. A process for the manufacture of unsaturated compounds of the cyclopentano polyhydro phenanthrene series, comprising subjecting a $\Delta^{1,2,4,5}$-10,13-dimethyl cyclopentano polyhydro phenanthrene compound having at the 3-carbon a hydrogen atom and a substituent taken from the class consisting of hydroxyl, ester and ether groups, to a thermal treatment whereby the methyl group is removed from the 10-position and a double bond is introduced into ring A.

37. A process for the manufacture of unsaturated compounds of the cyclopentano polyhydro phenanthrene series, comprising subjecting a $\Delta^{1,2,4,5}$-cholestadiene having a substituent taken from the class consisting of hydroxyl, ester, and ether groups attached to the 3-carbon atom, to a thermal treatment whereby the methyl group is removed from the 10-position and a double bond is introduced into ring A.

38. A process for the manufacture of unsaturated compounds of the cyclopentano polyhydro phenanthrene series, comprising subjecting a 10-methyl steroid compound having a keto group in the A ring and plurally unsaturated in the ring system, to the action of an etherifying agent capable of converting the enolized keto group into an ether group, and subsequently subjecting the resulting product to a thermal treatment whereby the methyl group is removed from the 10-position and a double bond is introduced into ring A.

39. A process for the manufacture of unsaturated compounds of the cyclopentano polyhydro phenanthrene series, comprising subjecting an unsaturated 10,13-dimethyl cyclopentano polyhydro phenanthrene compound having at least one but at most two double bonds in ring A, and having a substituent taken from the class consisting of hydroxyl, ester, and ether groups attached to the 3-carbon atom, to a thermal treatment whereby them methyl group is removed from the 10-position and a double bond is introduced into ring A.

40. The method of producing unsaturated cyclopentano polyhydro phenanthrene compounds, comprising causing the formation of at least two carbon-carbon double bonds in at least one of the rings A and B of a 10-methyl compound of the cyclopentano polyhydro phenanthrene series, whereby the 10-methyl group is rendered labile, and subjecting the so modified compound to a thermal treatment to remove the methyl group from the 10-position.

41. The method of producing unsaturated cyclopentano polyhydro phenanthrene compounds, comprising causing the formation of at least two carbon-carbon double bonds in at least one of the rings A and B of a 10-methyl compound of the cyclopentano polyhydro phenanthrene series, whereby the 10-methyl group is rendered labile, and subjecting the so modified compound to a thermal treatment in the presence of a mineral acid to remove the methyl group from the 10-position.

42. Iso-equilin of the empirical formula $C_{18}H_{20}O_2$ having a double bond between the 6 and 7-carbons.

43. Iso-equilin of the empirical formula $C_{18}H_{20}O_2$ and obtainable from nuclearly unsaturated 10,13-dimethyl cyclopentano polyhydro phenanthrene compounds by splitting off of the 10-methyl group.

HANS HERLOFF INHOFFEN.